INVENTOR.
RALPH B. THOMAS
BY Lawrence Burns,
ATTORNEY

Patented May 2, 1950

2,506,047

UNITED STATES PATENT OFFICE 2,506,047

PROTECTIVE DEVICE FOR USE IN SOLDERING OPERATIONS

Ralph B. Thomas, Beverly, Mass., assignor to Sylvania Electric Products Inc., Salem, Mass., a corporation of Massachusetts Application December 31, 1946, Serial No. 719,422

5 Claims. (Cl. 91—12.5)

This invention relates to electric discharge devices and more particularly to fluorescent lamps of the non-linear type.

In the manufacturing of fluorescent lamps of the linear type and more particularly in the basing of the lamp, the conventional practice in soldering the ends of the base pins has been to dispose the lamp on a substantially vertical axis and dip the base pins in a body of solder in a solder pot. Protection of the rest of the lamp from contact with the solder is usually accomplished by providing the solder pot with a mechanical stop which limits the depth to which an operator may insert the lamp pins into the solder during the soldering operation. This method has proved satisfactory in soldering the base pins of conventional linear fluorescent lamps.

However, it is not feasible to employ this method in soldering the base pins of a circular fluorescent lamp of the type shown in the accompanying drawing in which a lamp base of the type shown in my Patent 2,392,785 is used, because the distance between the ends of the base pins and the periphery of the base from which they extend is so small that, unless an operator manipulates the lamp very skillfully, the base will dip into the molten solder. This condition is undesirable, especially if the lamp base is of a material such as a plastic, which would be damaged by contact with the solder. The actual spacing between the solder level and the periphery of the base during the soldering operation is considerably less than the actual distance between the ends of the base pins and the periphery of the lamp base because it is necessary that the base pins actually extend into the solder rather than just contact the surface thereof in order that the soldering operation may be accomplished satisfactorily.

Therefore, an object of this invention is to provide a method of and apparatus for soldering the base pins of electrical devices in which provision is made to protect the device and its base from contact with the solder.

Further objects, advantages, and features will be apparent from the following specification when read in conjunction with the accompanying drawing in which.

In attempting to utilize a conventional mechanical stop to protect a circular lamp of the type shown in my Patent 2,392,785 during the base-pin soldering operation I have found that an accurate adjustment of the stop will permit an operator to solder the base pins of a few lamps satisfactorily but the level of the solder soon drops below the point where the base pins can reach the solder. It is then necessary for the operator to readjust the mechanical stop or add solder to raise the level thereof before the base-pin soldering operation may be resumed. This procedure is not conducive to high speed production.

Figure 1:
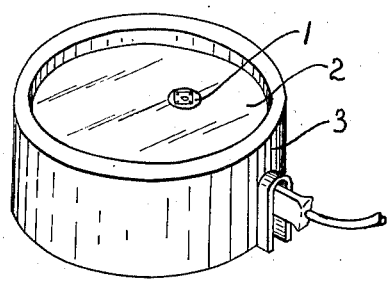
Figure 1 is a perspective view of a solder pot with the mica float of my invention disposed on top of the molten solder.

To overcome these difficulties and to permit an operator to continue to solder the base pins of circular lamps even after the level of the solder in the solder pot has changed from its original level I have designed a mica float which is disposed on the molten solder and on which a lamp base is seated during the soldering operation. In Figure 1, a mica float 1 is shown on the molten solder 2 in the solder pot 3. This mica float and the manner in which the lamp base is seated thereon is shown in Figure 2.

Figure 2:
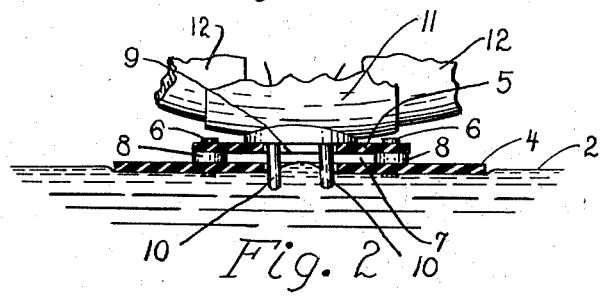
Figure 2 is a sectional view of the mica float with a portion of a based electric discharge device seated thereon with its base pins extending into the molten solder.
Figure 3:
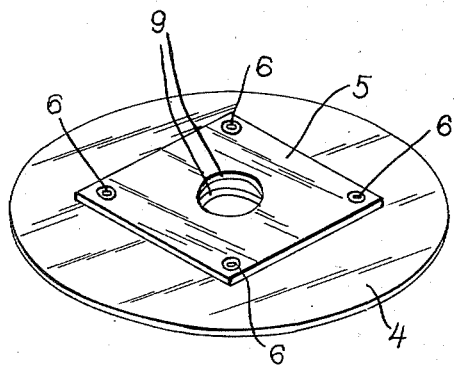
Figure 3 is a perspective view of one modification of a mica float.

The mica float 1, as shown in Figures 2 and 3, comprises a large mica base plate 4 and a small mica top plate 5. The plates 4 and 5 are joined to each other by eyelets 6 but spaced from each other by washers or spacers 8 to provide an insulating air space 7 therebetween. An opening 9 is provided in the center of the plates 4 and 5 to provide for the threading of the base pins 10 therethrough. The base pins 10 extend from the base 11 of the lamp 12 (a portion of which is shown in Figure 2) and project into the solder 2 when the base 11 is positioned on the top plate 5 of the mica float 1.

As may be seen from the illustration in Figure 2 the mica float 1 adequately protects the lamp base 11 and the lamp 12 during the base pin soldering operation even though the pins 10 extend but a short distance beyond the periphery of the lamp base. Since the mica member 1 floats on the molten solder, a change in the level of the solder does not make it necessary to effect any adjustment to enable the operator to continue the base pin soldering operation and at the same time the lamp base 11 and the lamp 12 continue to be adequately protected from contact with the molten solder.

Another feature of my invention is that it enables one to take advantage of the convex meniscus of solder. As may be seen in Figure 2 of the drawing, the solder within the opening 9 in the plate 4 is characterized by a convex meniscus. Since, as was pointed out above, the base pins of an electrical device must actually extend into the molten solder in order that the soldering operation may be performed satisfactorily, this characteristic of the solder can be utilized very advantageously in cases where the base pins extend but a short distance beyond the periphery of the base, such as in the instant case for example. As may be seen in Figure 2, the solder level within the opening 9 through which the base pins 10 extend is higher than the normal solder level. This condition is an aid in insuring the extension of the base pins into the solder an amount sufficient to effect the soldering operation satisfactorily. Since the opening 9 is only large enough to permit threading of the base pins therethrough, the lamp base from which the pins extend will not be unduly exposed to the molten solder at this point.

Although the float 1 has been described as being a mica float, it may be made of other materials, such as a wafer of a ceramic such as steatite, for example. Other materials may be used, the characteristic requirements being that the material be preferably of poor thermal conductivity, high heat resistance, and chemically resistant to solder. Of course, it should be of sufficient mechanical strength to serve the purpose for which it is intended to be used.

Figure 4:
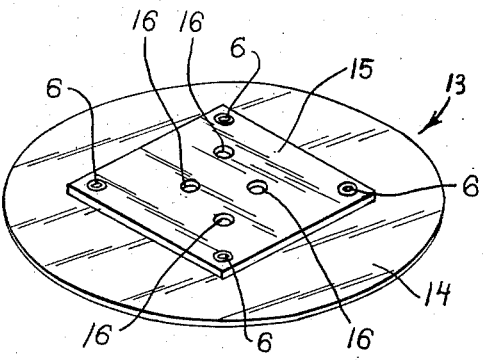
Figure 4 is a perspective view of another modification of a mica float.

An alternate modification of the float of my invention is shown in Figure 4. In Figure 4, the mica float 13 comprises a base plate 14 and a top plate 15, the plates 14 and 15 being connected to and insulated from each other in a manner similar to that employed in the float 1 of Figure 3. The plates 14 and 15 of the float 13 are provided with a plurality of holes 16 through which the lamp base pins may be threaded to accomplish the base pin soldering operation.

I have found that one of the factors which it is desirable to consider in the determination of the size of the float to be used is the amount of back pressure which will be exerted when the lamp is disposed in position with the base thereof resting on the float and the base pins extending therethrough and into the solder. It is advantageous from the operator's point of view to have considerable back pressure exerted because it serves as a warning signal to the operator that the pins are in the solder and no pressure in a downward direction need be exerted to cause the base pins to extend into the solder.

Although I have shown and described the float of my invention as one which is especially suitable for use in soldering the base pins of a fluorescent lamp, it will be readily apparent to those skilled in the art that it may be adapted advantageously in soldering the base pins of other electrical devices without departing from the spirit of the invention. In some of these adaptations it may only be necessary that the float be chemically resistant to solder. This would be true in cases where that portion of the device adjacent the base pins is of a material which would not be damaged if the float was not a poor thermal conductor and was not heat resistant.

What I claim is:

1. A float for protecting an electrical device having base pins extending therefrom during the operation of applying molten solder to the ends of the base pins, said float comprising a member which is of poor thermal conductivity, high heat resistance and chemically resistant to solder, and a second member mounted on and above said first mentioned member but spaced therefrom, both of said members being provided with a centrally disposed opening therein, in register with one another, through which the base pins may extend for the accomplishment of the base pin soldering operation.

2. A float for protecting an electrical device having base pins extending therefrom during the operation of applying molten solder to the ends of the base pins, said float comprising a member which is of poor thermal conductivity, high heat resistance and chemically resistant to solder, and a second member mounted on and above said first-mentioned member but spaced and insulated therefrom, both of said members being provided with a centrally disposed opening therein, in register with one another, through which the base pins may extend for the accomplishment of the base pin soldering operation.

3. A float for protecting an electrical device having base pins extending therefrom during the operation of applying molten solder to the ends of the base pins, said float comprising a member which is of poor thermal conductivity, high heat resistance and chemically resistant to solder, and a second member mounted on and above said first mentioned member but spaced therefrom, said second member being of poor thermal conductivity and high heat resistance, both of said members being provided with a centrally disposed opening therein, in register with one another, through which the base pins may extend for the accomplishment of the base pin soldering operation.

4. A float for protecting an electrical device having base pins extending therefrom during the operation of applying molten solder to the ends of the base pins, said float comprising a member which is of poor thermal conductivity, high heat resistance and chemically resistant to solder, and a second member mounted on and above said first mentioned member but spaced and insulated therefrom, said second member being of poor thermal conductivity and high heat resistance, both of said members being provided with a centrally disposed opening therein, in register with one another, through which the base pins may extend for the accomplishment of the base pin soldering operation.

5. A float for protecting an electrical device having base pins extending therefrom during the operation of applying molten solder to the ends of the base pins, said float comprising a member which is chemically resistant to solder, and a second member mounted on and above said first mentioned member but spaced therefrom, both of said members being provided with a centrally disposed opening therein, in register with one another, through which the base pins may extend for the accomplishment of the base pin soldering operation.

RALPH B. THOMAS.

REFERENCES CITED

The following references are of record in the file of this patent:

UNITED STATES PATENTS

| Number | Name | Date |
| --- | --- | --- |
| 15,111 | Howe et al. | June 10, 1856 |
| 735,019 | Pfister | July 28, 1903 |
| 2,015,929 | Goodwin | Oct. 1, 1935 |
| 2,182,364 | Smith | Dec. 5, 1939 |
| 2,293,455 | Disch et al. | Aug. 18, 1942 |
| 2,429,836 | McFarlane | Oct. 28, 1947 |